Figure 1:
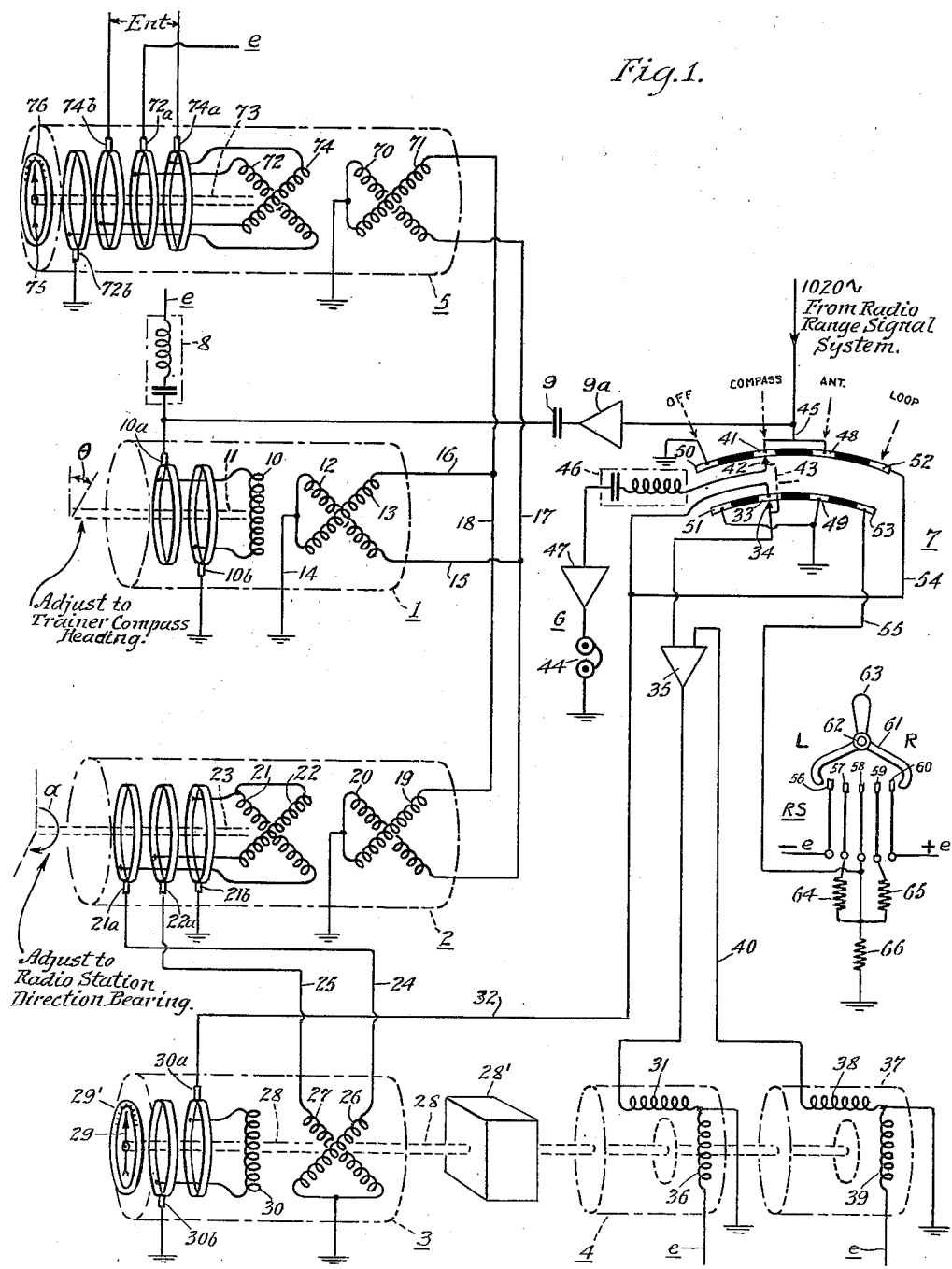

Dec. 12, 1950 R. C. DEHMEL 2,533,361
RADIO TRAINING SYSTEM FOR AIRCRAFT PILOTS
Filed June 22, 1946 2 Sheets-Sheet 1

INVENTOR.
Richard Carl Dehmel
BY
ATTORNEY

Dec. 12, 1950 R. C. DEHMEL 2,533,361
RADIO TRAINING SYSTEM FOR AIRCRAFT PILOTS
Filed June 22, 1946 2 Sheets-Sheet 2
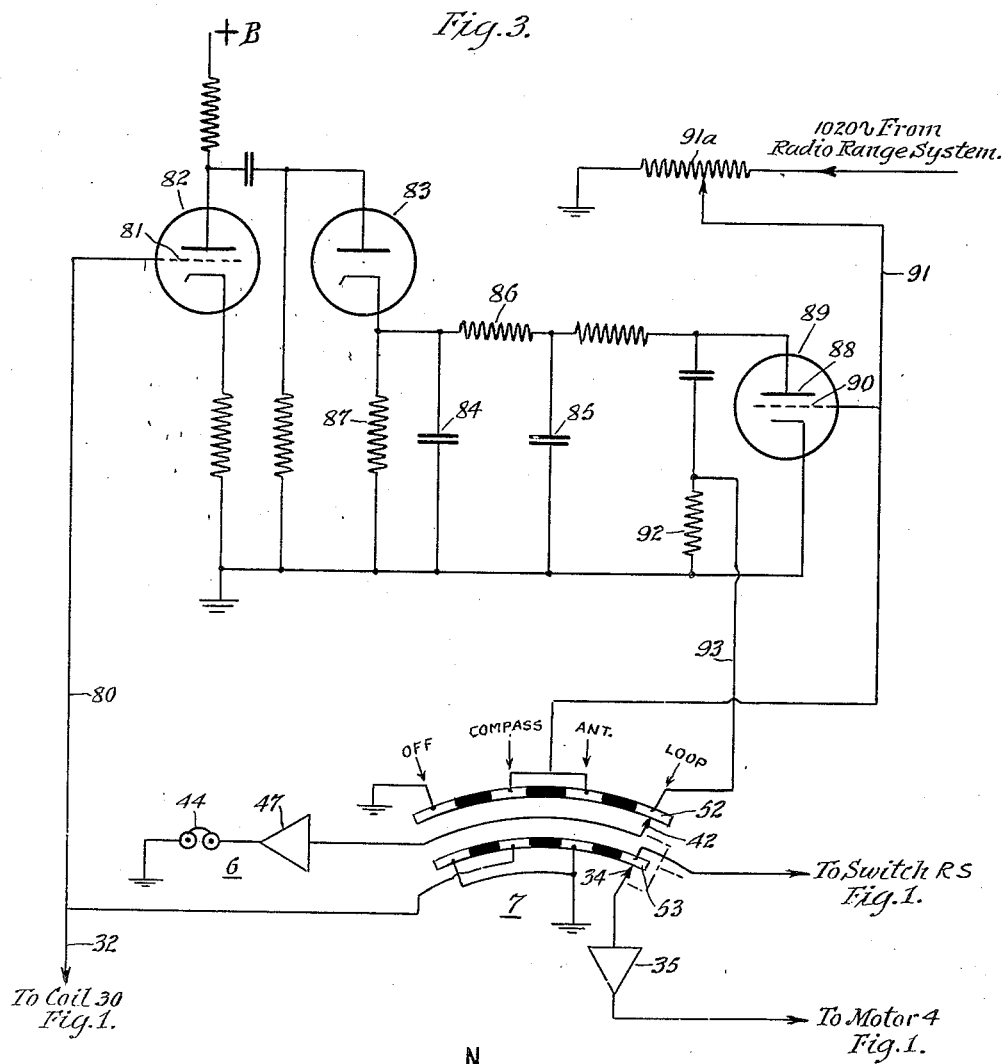
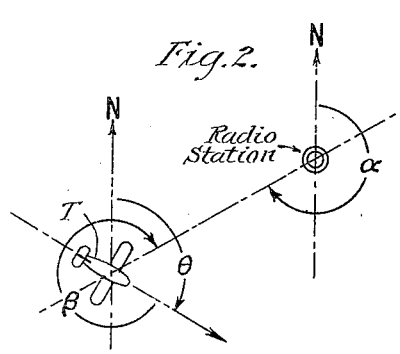
INVENTOR.
Richard Carl Dehmel
BY
ATTORNEY Patented Dec. 12, 1950

2,533,361

UNITED STATES PATENT OFFICE 2,533,361

RADIO TRAINING SYSTEM FOR AIRCRAFT PILOTS

Richard Carl Dehmel, Short Hills, N. J.

Application June 22, 1946, Serial No. 678,553

17 Claims. (Cl. 35—10.2)

This invention relates to radio training systems for aircraft pilots and navigators, and particularly to simulated radio range and direction finding systems used in connection with grounded flight trainers.

A training system for familiarizing the student pilot with methods of obtaining quick and accurate radio compass bearings and the usual radio range information should reproduce as faithfully as possible the commonly used and approved technique. For example, in a presently used system for obtaining during actual flight an aural "null" indication of the automatic radio compass the pilot proceeds to shift the radio control switch to position "loop" and then to operate a motor reversing switch which controls rotation of the directional loop antenna so as to bring in the "null" indication at his headphones. In this system the radio control switch can also be positioned so that the pilot may receive conventional radio range direction signals either exclusively or in combination with a continuously indicating automatic radio compass.

It is an object therefore of this invention to provide an improved radio training system of the above character that can be used in present type grounded flight trainers for realistically simulating actual procedure for obtaining radio compass bearings and other radio direction data.

Another object of this invention is to provide an improved electrical system including voltage resolvers controlled respectively in accordance with the compass heading of the trainer and the bearing of the trainer position from a simulated radio station for automatically obtaining the difference between the angles representing respectively the compass heading of the trainer and the bearing of the radio station with respect to the trainer position, thereby determining the radio compass bearing of the trainer with respect to said radio station.

Another object of this invention is to provide an improved electrical system of the above character wherein the automatic radio compass can be made to adjust itself continuously to indicate the radio station bearing by means of a null positioning motor that is controlled by a voltage corresponding to a deviation of the compass reading from the true bearing.

Another and more specific object of this invention in one form thereof is to provide an electrical resolving system for radio training systems of the above character that is simple and efficient both in design and operation, and that eliminates duplicate circuits and equipment by imposing on the same system a commercial power supply, such as a 60 cycle alternating current supply, and a conventional oscillator frequency supply, such as the 1020 cycle frequency supply for the well-known "A" and "N" radio range signals.

The invention will be more fully set forth in the following description referring to the accompanying drawings, and the features of novelty will be pointed out with particularity in the claims annexed to and forming a part of this specification.

Referring to the drawings,

Fig. 1 is a schematic layout of a radio training system for aircraft pilots embodying the present invention, Fig. 2 is a diagram illustrating the relationship of compass and radio bearings for a given flight position, and Fig. 3 is a circuit diagram illustrating an alternative arrangement for null signal control.

In general, the radio training system comprises a voltage resolver 1 functioning as a transmitter and arranged to be adjusted to the angle $\theta$ (trainer compass heading), a receiving voltage resolver 2 arranged to be adjusted to the angle $\alpha$ (direction bearing of a simulated radio station), a rotary transformer 3 connected to the resolver 2 for simulating an automatic radio compass, an operating motor 4 for the rotary transformer arranged to control the radio compass indicating element so as to indicate the difference between the angles $\theta$ and $\alpha$ thereby determining the radio compass bearing of the trainer with respect to the simulated radio station as diagrammatically illustrated by Fig. 2, a rotary transformer 5 connected to the transmitter 1 and functioning primarily as a repeater for simulating a remote indicating compass to give the heading of the trainer with respect to a reference direction, usually north, a conventional radio range receiving system generally indicated at 6 for aural indication of signals, such as the usual "A" and "N" signals, and control switching apparatus 7 for enabling the pilot to transfer from one radio direction system to another in accordance with established practice. For the purposes of this specification the term "radio compass" is intended to comprehend radio direction finders generally.

Referring now to the more specific details of the system, the transmitter 1 comprises a rotary single phase coil 10 connected to an operating shaft 11 and a pair of fixed coils 12 and 13 arranged in quadrature with a common ground connection at 14. The rotatable coil or winding 10 is energized from a conventional 60 cycle alternating current supply source e through a suitable filter 8 and also from the output of a radio range signal simulating system including an oscillator source such as a 1020 cycle supply commonly used for radio range signals through an amplifier 9a and slip-ring connection 10a. The other terminal of the coil is grounded through a slip-ring connection 10b. A suitable filter for the signal circuit is provided by the condenser 9 and the inductance of coil 10 assuming that said inductance is sufficiently high.

Accordingly there will be induced in the fixed two-phase windings 12 and 13 voltages from the 60 cycle supply and superimposed radio range signal voltages depending on the angular relationship of the single phase coil 10 to the fixed two-phase quadrature windings. Assuming for example that the shaft 11 and therefore the coil 10 is rotated from a fixed reference position, such as the north compass position through an angle $\theta$ and that the voltage in coil 10 is represented by E the voltage induced in coil 12 may be expressed as E sin $\theta$ and the voltage induced in coil 13 as E cos $\theta$. These voltages are transmitted by means of the coil terminal conductors 15 and 16 to the common conductors 17 and 18 for supplying the two-phase fixed windings of both the rotary transformer 2 and compass repeater 5.

Referring first to the rotary transformer 2, the two-phase fixed primary windings 19 and 20 are arranged in quadrature in inductive relation to the rotatable two-phase quadrature windings 21 and 22 which are connected to the rotatable shaft 23 for angular adjustment with respect to the fixed windings. The shaft 23 is positioned in accordance with the direction bearing relative to north of a simulated radio station on which a bearing is desired and it will be seen that when the shaft 23 is rotated from a fixed reference position, such as the aforesaid north reference position through an angle $\alpha$ corresponding to the instant flight position bearing from the station, the voltage induced in the secondary winding 21 may be expressed in terms of the primary voltages as $$E \sin \theta \cos \alpha + E \cos \theta \sin \alpha$$

and the induced voltage in winding 22 as $$E \cos \theta \cos \alpha + E \sin \theta \sin \alpha$$

In other words, the Cartesian coordinate system to which the quadrature voltages E sin $\theta$ and E cos $\theta$ may be referred can be considered as rotated through the angle $\alpha$ by means of the quadrature windings 21 and 22 of the two-phase to two-phase resolver. Apparatus of this character is also disclosed in my copending application S. N. 560,288 filed October 25, 1944 for "Coordinate Conversion and Vector Apparatus." This application has matured into Patent Number 2,510,384 dated June 6, 1950. The induced voltages in the quadrature windings 21 and 22 are transmitted respectively by means of slip-ring connections 21a and 22a and terminal conductors 24 and 25 to the fixed quadrature windings 26 and 27 of the rotary transformer 3 which simulates the automatic radio compass. The other terminals of the windings are grounded through the common slip-ring connection 21b.

It is sufficient for the purposes of the present invention to refer generally to the operating means for the trainer compass bearing shaft 11 and the flight position bearing shaft 23 since any suitable means for positioning the shafts can be used. For example, a system that can be used for controlling the operation of these shafts is disclosed in my Patent No. 2,366,603 granted January 2, 1945 for "Aircraft Training Apparatus" wherein the shaft 61 operated from the steering motor SM, Figs. 1, 2 and 23, corresponds to the present trainer bearing shaft 11, and the signal controller shaft 102, Fig. 8, of the aforesaid patent corresponds to the present radio station bearing shaft 23. When so controlled the shafts 11 and 23 are automatically adjusted to the angles $\theta$ and $\alpha$ respectively as above defined.

If it is desired to use the invention in connection with polar coordinate charting apparatus, the system disclosed in my copending application S. N. 511,732 filed November 25, 1943 for "Navigation Apparatus for Aircraft and Training Devices" can also be used. This application has matured into Patent Number 2,475,314, dated July 5, 1949. In this system, the compass shaft 40, Fig. 1, corresponds to the present shaft 11 and the chart shaft 104, Figs. 1 and 11, corresponds to the present shaft 23.

Referring to Fig. 2, the angle $\theta$ represents the angle relative to north of the direction of simulated flight of the trainer T, i. e. the trainer compass heading, and the angle $\alpha$ represents the angle in azimuth relative to north of the radio station direction with respect to the instant flight position of the trainer. Upon inspection it is seen that $$\alpha - \theta = \beta - 180°$$

Accordingly the actual bearing $\beta$ of the radio station relative to the nose of the trainer is the angle $\alpha - \theta + 180°$, and it is the function of the radio compass to indicate the angle $\beta$.

Automatic indication of the simulated radio compass or direction-finder 3 is obtained by means of the two-phase motor 4 that is connected through a speed reduction gear box 28' to the shaft 28 which carries a single phase coil 30 disposed in inductive relation to the quadrature windings 26 and 27 and a compass pointer element 29 cooperating with a suitable azimuth scale 29' for indicating the aforesaid radio station bearing. The pointer element 29 is preset 180° with respect to its zero reference position in order that the angle $\beta$, instead of the angle $\beta - 180°$, may be directly read on the azimuth scale 29'. The reason for this 180° adjustment will be apparent from the fact that the angle $\alpha$ is taken from the radio station to the flight position whereas the angle $\beta$ is that taken from the aircraft, thus representing a shift of 180°. One terminal of coil 30 is connected through a slip-ring connection 30a to a circuit conductor 32 and the other terminal is grounded through slip-ring connection 30b.

The motor 4 is controlled in accordance with the voltage induced in the coil 30 so as to rotate the coil 30 in one direction or the other depending on the magnitude and sense of the induced voltage therein until a balanced or null position is reached where no voltage is induced in the coil. At this point the motor is de-energized and stops. The corresponding position of the coil 30 represents the angle $\alpha - \theta$ and the radio station bearing can be read directly from the compass element 29 and scale 29'. Specifically, this is accomplished by energizing a phase winding 31 of the motor in accordance with the voltage of coil 30 through the slip-ring connection 30a, conductor 32, contacts 33—34 of the switching apparatus 7, and the amplifier 35 which also is designed to function as a 90° phase shifter.

The other phase winding 30 is energized from the usual 60 cycle A. C. supply e. For the purpose of stabilizing the operation of the motor 4 and also to provide for its operation at a normally linear speed characteristic with respect to the voltage of coil 30, the motor may be connected to a feed-back generator 37 having two-phase windings 38 and 39. The winding 39 is energized from the 60 cycle A. C. supply e and the voltage induced in winding 38, which is proportional to the motor-generator speed and has an instant polarity opposite to that of the signal at contact 34, is fed back by conductor 40 to the input of the amplifier 35 for modifying the input current to winding 31 in a well known manner.

Accordingly it will be seen that as the phase relationship of the voltage in coil 30, and hence that in motor winding 31, varies within a range of 180° the motor 4 will operate in one direction or the other and at a speed corresponding to the magnitude of the voltage which is proportional to the extent of deviation of compass element 29 from the true bearing. This operation continues until the coil 30 is rotated to a neutral or balanced position where no voltage is induced therein. Overshooting of the null position is therefore precluded since the motor speed is reduced in anticipation of the null. Automatic and continuous operation of the radio compass can therefore be obtained by the pilot as long as the contacts 33—34 are closed on the "compass" position. At the same time, the radio range signal system is in normal operation through the contacts 41—42 of the switching apparatus, the sliding contacts 34 and 42 being mechanically connected to each other as indicated at 43 for simultaneous operation by the pilot.

A suitable radio range signal system, such as that disclosed in my patent above cited may be used and further description thereof is unnecessary for a complete understanding of the present invention other than to point out that the pilot's headphones 44 are energized from the radio range signal system by conductor 45, contacts 41—42 ("compass" position), oscillator frequency pass filter 46 and amplifier 47. When the pilot wishes to navigate solely by the radio range signals, he moves the slider 43 to the right to the "antenna" position thereby holding the range signal system through the contacts 42 and 48 and cutting out the radio compass by grounding the slider contact 34 at contact 49. For cutting out both systems, the sliders are moved to the left to the "off" position so as to engage the grounded contacts 50 and 51.

In the radio compass system so far described the pilot relies on visual indication solely for checking his bearing. It is also desirable in practice to use the so-called "aural null" method for an instant bearing. According to this method the directional loop antenna of the aircraft is rotated either by a hand crank by the pilot, or by a motor until the plane of the loop is normal to the direction of the radio station. In this position practically no signal voltage is induced in the loop and a null is indicated at the pilot's headphones. It will be apparent that in this case there will be two nulls each 180° apart. The bearing of the radio station therefore can be determined from the angular position of the loop with respect to the longitudinal axis of the aircraft and the observed compass reading by standard orientation procedure.

According to the present invention this method is simulated by means of a control system for connecting the coil 30 to the pilot's headphone system and operating the motor 4 in one direction or the other by means of a reversing switch until the null position is reached. For operating on this system, the pilot moves the slider 43 to the "loop" position so that slider contacts 42 and 34 engage the fixed contacts 52 and 53 which are connected respectively by conductors 54 and 55 to the coil 30 and the reversing switch RS. This switch comprises a plurality of alined contacts 56, 57, 58, 59 and 60 each mounted on a leaf spring and normally spaced from each other as illustrated. The terminals of contacts 56 and 60 are connected respectively to 60 cycle A. C. supply sources —e and +e, referring to instant polarities of said supply sources. The terminal of the central contact 58 is connected to the motor supply conductor 55. These contacts are operated by means of a "walking beam" type lever 61 having overhanging extensions alined with the contacts. The beam is pivoted above and centrally with respect to contacts at 62. By tilting the switch handle 63 to the right for example, contacts 60, 59 and 58 are engaged in sequence so as to complete the circuit between the source +e and the motor winding 31 to cause rotation of the coil 30 in a given direction. Movement of the switch handle toward the left opens the closed contacts and causes engagement of contacts 56, 57 and 58 so as to connect the motor directly to the source —e, thereby causing rotation of the coil 30 in the opposite direction. In order to operate the motor at low speed as the null position is approached so as to obtain a more precise bearing and to avoid overshooting, the contacts 57 and 58 are shunted by a resistance 64, and the contacts 58 and 59 are shunted by a resistance 65 which are included in the motor winding circuit when the switch handle is tilted slightly so as to close but the contacts 59—60, or the contacts 56—57, as the case may be. The central contact 59 is grounded as illustrated through a resistance 66.

In view of the fact that the 1020 cycle oscillator supply may if desired be superimposed on the 60 cycle power supply in one form of the invention, it will be apparent that when the coil 30 has been rotated to a null position the oscillator frequency voltage will also be zero so that the pilot gets a null indication at his headphones. The pilot by operating the switch RS to its fully closed position can bring the radio compass toward the null position fairly rapidly and then by changing to the low speed position can obtain a quite accurate reading of the radio compass bearing. In view of the fact that the motor 4 is now directly connected to a 60 cycle A. C. source, the pilot opens the switch immediately upon reaching the null indication and gets his bearing from the radio compass element 29. It will be apparent that the radio compass shaft 28 may be operated by a manual crank if desired for getting the aural null reading.

Where desired, a remote indicating compass can also be simulated by means of the repeater 5 which is provided with two-phase fixed quadrature windings 70 and 71 connected directly to the transmitter 1 so as to be energized by the voltages E sin θ and E cos θ respectively. A single phase winding 72 energized from a 60 cycle A. C. source e through a slip-ring connection 72a is mounted on a rotatable shaft 73 in inductive relation to the fixed windings 70 and 71 so that it tends to be positioned according to the position of coil 10 of the transmitter. The other terminal of coil 72 is grounded through a slip-ring connection 72b.

For the purpose of introducing "north turning error" and "acceleration error," a disturbing coil 74 energized through slip-ring connections 74a and 74b by a voltage $E_{nt}$ variable between zero and an amount sufficient to cause deflection of the coil through a material angle is likewise mounted on the shaft 73 so as to modify the position thereof according to simulated turning and acceleration error. A simulated compass system including a disturbing coil of this character and means for producing suitable north turning error potentials, such as voltage $E_{nt}$ for the remote indicating compass 5 is disclosed in my copending application S. N. 624,442 filed October 25, 1945 for "Flight Navigation Training Apparatus." This application has been matured into Patent Number 2,506,998 dated May 9, 1950. However, the turning error voltage $E_{nt}$ may be introduced in any suitable manner, such as by means controlled by the instructor according to indicated turning of the trainer. The shaft 73 is connected to a compass pointer 75 which cooperates with a suitable azimuth scale 76 for giving a remote indication of the trainer compass heading subject to the aforesaid north turning error.

An alternative arrangement for controlling the aural null signal when the control switch is on "loop" is shown by Fig. 3. Instead of superimposing the radio range signal current on the power current as in Fig. 1, the radio range signals are controlled in accordance with the potential across the coil 30 of the simulated radio compass so that a null signal is obtained when the coil is in a null position. To this end, the coil 30 is connected by conductor 80 to the grid 81 of an electronic amplifying tube or triode 82, the output of which is delivered to and rectified by the diode valve 83. A suitable filter arrangement comprising capacitances 84 and 85 and resistance 86 is connected across the rectifier load resistance 87 and the D. C. output is impressed on the anode 88 of the triode 89. The control grid 90 of this triode is connected by conductor 91 through an audio control resistance 91a to the output of the radio range signal system, which is energized from a 1020 cycle source as previously explained. The triode load resistance 92 is connected by conductor 93 to the switch contact 52 at the "loop" position. Assuming now that the coil 30 is off-center with respect to its null position so that a potential appears across its terminals, the grid 81 of the amplifying tube 82 is energized accordingly. The amplifier output is rectified and "smoothed" by the diode 83 and filter circuit 84—86 respectively so that a positive D. C. potential is impressed on the plate 88 of the triode 89. Since the grid 90 is continuously energized from the A—N radio range signal system it will be apparent that a 1020 cycle current will flow in the triode load circuit including resistance 92 as long as sufficient plate potential is maintained. Therefore when the control switch 7 is on "loop" the pilot's headphones are energized from the load circuit of triode 89 through the amplifier 47, contacts 42, 52 and conductor 93. When the coil 30 is at its null position no potential appears at the grid 81 and therefore no output current is delivered to the rectifier for maintaining a signal sustaining D. C. potential at the plate 88. Consequently a null signal is obtained at the pilot's headphones. This system can be used independently of the characteristics of the transmitter 1 and therefore does not depend on the coil 10 having a suitable inductance for filter purposes.

It should be understood that this invention is not limited to specific details of construction and arrangement thereof herein illustrated, and that changes and modifications may occur to one skilled in the art without departing from the spirit of the invention.

What is claimed is:

1. In a radio training system for navigators, means for simulating radio compass equipment comprising voltage resolving means having relatively movable coacting parts, one of which is adapted for adjustment to an angle representing a trainer compass heading, a second voltage resolving means having additional relatively movable coacting parts, one of which is adapted for adjustment to an angle representing a radio station direction bearing from a reference direction, both said resolving means being electrically interconnected with one of said resolving means functioning as a transmitter and the other as a receiver so that one of said adjustments modifies the other, a radio compass indicating element, and electrical means solely responsive to resolved voltages resulting from said modified adjustment for positioning said element so as to represent the difference between said angles thereby determining the corresponding radio compass bearing angle with respect to said station.

2. In a radio training system for navigators, means for simulating radio compass equipment comprising a rotary transformer functioning as a transmitter, a second rotary transformer connected in receiving relation thereto, one of said transformers adapted for adjustment to an angle representing a trainer compass heading and the other adapted for adjustment to an angle representing a radio station direction bearing from a reference direction, a third rotary transformer the primary winding of which is energized by the output of said second transformer, and a compass indicating element movable according to relative rotation of the windings of said third transformer, said compass element being arranged to indicate the corresponding radio compass bearing with respect to said station when the potential induced in the secondary winding of said third transformer represents a null condition.

3. In a radio training system for navigators, means for simulating radio compass equipment comprising voltage resolving means adjustable to an angle representing a trainer compass heading, a second voltage resolving means adjustable to an angle representing a radio station direction bearing from a reference direction, one of said resolving means functioning as a transmitter and the other as a receiver so that the resolved output of said transmitter is modified by the adjustment of said receiver, a third voltage resolver energized by the modified output of said receiver, means for adjusting said third resolver to a null condition in respect to the output potential thereof and a radio compass indicating element controlled by the aforesaid adjusting means for indicating at the null position the corresponding radio compass bearing of said station.

4. In a radio training system for navigators, means for simulating radio compass equipment comprising voltage resolving means adjustable to an angle representing a trainer compass heading, a second voltage resolving means adjustable to an angle representing a radio station direction bearing from a reference direction, one of said resolving means functioning as a transmitter and the other as a receiver so that the resolved output of said transmitter is modified by the adjustment of said receiver, a third voltage resolver energized by the modified output of said receiver, means for adjusting said third resolver to a null condition in respect to the output potential thereof, a source of signals simulating radio range signals and a receiver therefor, said source being related to said third resolver so that the adjustment to said null condition also causes null reception of said signals, and a radio compass indicating element controlled by the aforesaid adjusting means for indicating at the null position the corresponding radio compass bearing of said station.

5. In a radio training system for navigators, means for simulating radio compass equipment comprising voltage resolving means adjustable to an angle representing a trainer compass heading, a second voltage resolving means adjustable to an angle representing a radio station direction bearing from a reference direction, one of said resolving means functioning as a transmitter and the other as a receiver so that the resolved output of said transmitter is modified by the adjustment of said receiver, a third voltage resolver energized by the modified output of said receiver, motive means operatively connected to said third voltage resolver and responsive to its output potential for adjusting said third resolver to a null condition with respect to said output potential and a radio compass indicating element controlled by the aforesaid adjusting means for indicating at the null position the corresponding radio compass bearing of said station.

6. In a radio training system for navigators, means for simulating radio compass equipment comprising voltage resolving means adapted for adjustments to angles representing a trainer compass heading and a radio station direction bearing from a reference direction respectively, said resolving means being arranged so that one of said adjustments modifies the other, a rotary transformer having primary and secondary windings, the primary winding being energized by the modified output of said resolving means, said windings being relatively movable for obtaining a null condition with respect to the secondary winding potential, a motor energized according to said secondary winding potential for producing relative movement of said windings until said null condition is obtained, and a radio compass indicating element movable according to relative movement of said windings for automatically indicating the corresponding radio compass bearing of said station when said null condition is obtained.

7. In a radio training system for navigators, means for simulating radio compass equipment comprising voltage resolving means adapted for adjustments to angles representing a trainer compass heading and a radio station direction bearing from a reference direction respectively, said resolving means being energized by a low frequency power potential and also by an audio frequency potential and arranged so that one of said adjustments modifies the other, a rotary transformer having primary and secondary windings, the primary winding being energized by the modified output of said resolving means, said windings being relatively movable for obtaining a null condition with respect to the secondary winding potential, an electric motor energized according to the secondary winding low-frequency potential for causing relative movement of said windings to said null position; an audio signal receiver arranged to be associated with said secondary windings so that a null audio frequency signal is also obtained at the null position of said windings, and a radio compass indicating element movable according to relative movement of said windings for indicating the corresponding radio compass bearing of said station when said null signal is obtained.

8. In a radio training system for navigators, means for simulating radio compass equipment comprising voltage resolving means adapted for adjustments to angles representing a trainer compass heading and a radio station direction bearing from a reference direction respectively, said resolving means being arranged so that one of said adjustments modifies the other, a rotary transformer having primary and secondary windings, the primary winding being energized by the modified output of said resolving means, said windings being relatively movable for obtaining a null condition with respect to the secondary winding potential, a source of signals simulating radio range signals and a receiver therefor, a two-phase motor one phase of which is energized according to said secondary winding potential for producing relative movement of said windings until said null condition is obtained and a radio compass indicating element movable according to relative movement of said windings for automatically indicating the corresponding radio compass bearing of said station when said null condition is obtained.

9. In a radio training system for navigators, means for simulating radio compass equipment comprising voltage resolving means adapted for adjustments to angles representing a trainer compass heading and a radio station direction bearing from a reference direction respectively, said resolving means being arranged so that one of said adjustments modifies the other, a voltage resolving unit energized by the modified output of said resolving means, an electric motor arranged to be energized according to the output potential of said unit for automatically adjusting said unit to a null position in which said output potential is a minimum, feed-back control means responsive to the speed of said motor for stabilizing the operation thereof with respect to said output potential, and a radio compass indicating element actuated by said motor for indicating the corresponding radio compass bearing of said station at said null position.

10. In a radio training system for navigators, means for simulating radio compass equipment comprising voltage resolving means adapted for adjustments to angles representing a trainer compass heading and a radio station direction bearing from a reference direction respectively, said resolving means being arranged so that one of said adjustments modifies the other, a voltage resolving unit energized by the modified output of said resolving means, an electric motor arranged to be energized for adjusting said unit to a null position in which its output potential is a minimum, a source of signals simulating radio range signals and a receiver therefor arranged to be associated with said unit so that a null signal is obtained at said null position, circuit controlling means for operating said motor under direction of the navigator and for concurrently connecting said receiver for null signal reception, and a radio compass indicating element actuated by said motor for indicating the corresponding radio compass bearing of said station when a null signal obtains.

11. In a radio training system for navigators, means for simulating radio compass equipment comprising voltage resolving means adapted for adjustments to angles representing a trainer compass heading and a radio station direction bearing from a reference direction respectively, said resolving means being arranged so that one of said adjustments modifies the other, a voltage resolving unit energized by the modified output of said resolving means, an electric motor arranged to be energized either automatically according to the output potential of said unit or under the direction of the navigator for adjusting said unit to a null position in which said output potential is a minimum so as to simulate loop antenna adjustment, a radio range signal system including a receiver adapted to be controlled in accordance with the magnitude of said output potential for obtaining a null signal at said null position when said motor is under control of the navigator, and a radio compass indicating element actuated by said motor for indicating the corresponding radio compass bearing of said station at said null position.

12. In a radio training system for navigators, radio compass simulating apparatus comprising means adjustable to a direction angle for deriving a pair of quadrature voltages representing respectively quadrature vector components, means for resolving and rotating said quadrature components for reference to another set of quadrature axes including a rotary transformer having a two-phase quadrature winding energized respectively by said voltages, a second two-phase quadrature winding arranged in inductive relation to said first-named quadrature winding, and means for moving one of said quadrature windings with respect to the other through an angle represented by another direction angle whereby the set of quadrature axes to which the induced voltages in the phases of the second quadrature winding are referred are represented as rotated through said last-named angle, one of said angles representing a trainer compass heading and the other representing a radio station direction bearing from a reference direction, a second rotary transformer having a two-phase quadrature winding energized by the aforesaid induced voltages and a single phase secondary winding, means for adjusting said second rotary transformer so as to produce a null voltage condition in said secondary winding representing the difference between said angles, and a radio compass indicating element positioned by said transformer adjusting means so as to indicate a radio compass bearing at the null position thereof.

13. In a radio training system for navigators, radio compass simulating apparatus comprising means adjustable to a direction angle for deriving a pair of quadrature voltages representing respectively quadrature vector components, means for resolving and rotating said quadrature components for reference to another set of quadrature axes including a rotary transformer having a two-phase quadrature winding energized respectively by said voltages, a second two-phase quadrature winding arranged in inductive relation to said first-named quadrature winding, and means for moving one of said quadrature windings with respect to the other through an angle represented by another direction angle whereby the set of quadrature axes to which the induced voltages in the phases of the second quadrature winding are referred are represented as rotated through said last-named angle, an inductive device energized by said induced voltages for determining the difference between said angles and an indicator connected to said device for simulating a radio compass.

14. In a radio training system for navigators, means for simulating compass equipment comprising an inductive transmitter having a single phase primary winding energized from an A. C. source and a two-phase quadrature secondary winding, said windings being relatively movable through an angle representing a trainer compass heading, an inductive repeater having a two-phase quadrature primary winding energized by the secondary output of said transmitter and a two-phase quadrature secondary winding, one phase of said quadrature secondary being energized from an A. C. source and the other phase energized according to simulated compass error, said repeater primary and secondary winding being relatively movable, a compass indicating element movable according to said relative movement so as to simulate a remote indicating compass, and means operatively connected to said transmitter and adjustable according to a radio station bearing for simulating a radio compass.

15. In a radio training system for navigators, means for simulating radio compass equipment including electrical means adjustable to a plurality of direction angles, null indicating means energized from said electrical means and adjustable to a null voltage condition to represent a radio compass reading on a radio station, and means operatively connected to said null-indicating means for detecting said null condition in a radio range signal system including a source of audio frequency current comprising a thermionic valve having an anode energized when a positive voltage condition as contrasted with a null voltage condition obtains at said null indicating means and a control grid connected to the audio frequency signal source, and a signal receiver connected to the output circuit of said valve whereby audio signals are received when said anode is energized and a null signal is obtained during said null voltage condition.

16. In a radio training system for navigators, means for simulating radio compass equipment including electrical means adjustable to a plurality of direction angles, null indicating means energized from said electrical means and adjustable to a null voltage condition to represent a radio compass reading on a simulated station, and means for detecting said null condition in a radio range signal system including a source of audio frequency current comprising amplifying means energized when a positive voltage condition as contrasted with a null voltage condition obtains at said null indicating means, means for rectifying the output of said amplifying means, a thermionic valve having an anode energized by the rectified output voltage and a control grid energized from the audio frequency signal source, and a signal receiver connected to the output circuit of said valve whereby audio signals are received when said amplifying means is energized and a null signal is obtained during said null voltage condition.

17. In a radio training system for navigators, means for simulating radio compass equipment comprising voltage resolving means energized by a power current and adjustable in accordance with the trainer compass heading and the radio station direction bearing respectively, null indicating means having relatively movable primary and secondary windings inductively related, the primary winding being energized by output potential from said resolving means, and said null indicating means being adjustable to a null voltage condition with respect to said secondary winding to represent a corresponding radio compass reading on said station, and means for detecting said null condition in a radio range signal system including a source of audio frequency current comprising a thermionic valve operatively connected to said secondary winding and having an anode energized according to the winding voltage and a control grid energized from the audio frequency signal source, and a signal receiver connected to the output circuit of said valve whereby audio signals are received when said anode is energized and a null signal is obtained during said null voltage condition.

RICHARD CARL DEHMEL.

REFERENCES CITED

The following references are of record in the file of this patent:

UNITED STATES PATENTS

| Number | Name | Date |
|---|---|---|
| 1,612,117 | Hewlett | Dec. 28, 1926 |
| 2,164,412 | Koster | July 4, 1939 |
| 2,321,799 | Cone | June 15, 1943 |
| 2,332,523 | Norden | Oct. 26, 1943 |
| 2,343,945 | Weathers | Mar. 14, 1944 |
| 2,366,603 | Dehmel | Jan. 2, 1945 |
| 2,395,477 | Gumley | Feb. 26, 1946 |
| 2,408,081 | Lovell | Sept. 24, 1946 |
| 2,416,727 | Adorjan | Mar. 4, 1947 |
| 2,417,229 | Alexanderson | Mar. 11, 1947 |
| 2,428,800 | Holden | Oct. 14, 1947 |
| 2,448,544 | Muller | Sept. 7, 1948 |
| 2,460,305 | Muller | Feb. 1, 1949 |
| 2,485,331 | Stuhrman | Oct. 18, 1949 |